United States Patent
Keromytis et al.

(10) Patent No.: US 8,228,815 B2
(45) Date of Patent: *Jul. 24, 2012

(54) SYSTEMS AND METHODS FOR COMPUTING DATA TRANSMISSION CHARACTERISTICS OF A NETWORK PATH BASED ON SINGLE-ENDED MEASUREMENTS

(75) Inventors: Angelos D. Keromytis, New York, NY (US); Sambuddho Chakravarty, New York, NY (US); Angelos Stavrou, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/648,091

(22) Filed: Dec. 28, 2009

(65) Prior Publication Data
US 2010/0157834 A1 Jun. 24, 2010

Related U.S. Application Data

(63) Continuation of application No. 11/940,231, filed on Nov. 14, 2007, now Pat. No. 7,660,261.

(60) Provisional application No. 60/858,868, filed on Nov. 14, 2006.

(51) Int. Cl.
*H04L 12/28* (2006.01)
(52) U.S. Cl. ...................................................... 370/252
(58) Field of Classification Search .................. 370/252, 370/253, 254, 255, 235, 229, 238, 237, 465, 370/912, 230, 232; 709/226, 223, 238, 235, 709/234
See application file for complete search history.

(56) References Cited

U.S. PATENT DOCUMENTS

| | | | |
|---|---|---|---|
| 5,687,167 A | 11/1997 | Bertin et al. | |
| 6,795,399 B1 | 9/2004 | Benmohamed et al. | |
| 7,660,261 B2 * | 2/2010 | Keromytis et al. | 370/252 |

OTHER PUBLICATIONS

Antoniades, D. et al., "Available Bandwidth Measurement as Simple as Running wget. In Proceedings of Passive and Active Measurements (PAM)," Mar. 2006.
Chakravarty, S. et al., "LinkWidth: A Method to Measure LinkCapacity and Available Bandwidth using Single-End Probes," Computer Science Department Technical Report CUCS-002-08, Columbia University, Jan. 2008.
Chen, L. et al., "End-to-End Asymmetric Link Capacity Estimation," IFIP Networking, 2005.
Downey, A., "Using pathchar to Estimate Internet Link Characteristics," ACM SIGCOMM, 1999.
Gerla, M. et al., "TCP Westwood: Congestion Window Control Using Bandwidth Estimation. In Proceedings of IEEE Globecom," vol. 3 (Nov. 2001), pp. 1698-1702.
Grieco. L. A., and Mascolo, S., Performance Evaluation and Comparison of Westwood+, New Reno, and Vegas TCP Congestion Control. ACM Computer Communication Review 34, 2 (Apr. 2004).

(Continued)

*Primary Examiner* — Chi Pham
*Assistant Examiner* — Alexander Boakye
(74) *Attorney, Agent, or Firm* — Byrne Poh LLP

(57) ABSTRACT

Systems and methods for computing data transmission characteristics of a network path are disclosed. In some embodiments, the network path has a sending host, at least one intermediate host, and a receiving host, and the data transmission characteristics are computed based on single-ended measurements performed at the sending host.

18 Claims, 14 Drawing Sheets

OTHER PUBLICATIONS

Hu, N. et al., "Locating Internet Bottlenecks: Algorithms, Measurements, and Implications," SIGCOMM 2004.

Jacobson, V., "PATHCHAR," http://www.caida.org/tools/utilities/others/pathchar, 1997.

Jain, M. et al., "End-to-End Available Bandwidth: Measurement Methodology, Dynamics, and Relation with TCP Throughput," ACM SIGCOMM 2002.

Kapoor, R. et al., "Cap Probe: A Simple Technique to Measure Path Capacity," ACM SIGMETRICS, 2004.

Mah, B., "PCHAR," http://www.kitchenlab.org/www/bmah/Software/pchar, 1997.

Melander, B. et al., "A New End-to-End Probing and Analysis Method for Estimating Bandwidth Bottlenecks," Global Internet Symposium, 2000.

Prasad, R. et al., "Bandwidth estimation: Metrics, Measurement Techniques, and Tools," IEEE Network, 2003.

* cited by examiner

| CBR/UDP Cross Traffic Rate(Mbps) | 0 | 20 | 40 | 50 |
|---|---|---|---|---|
| LinkWidth | 88(I)/87(A) 90(I)/78(A) | 66(I)/63(A) | 48(I)/45(A) | 43(I)/40(A) |
| Iperf | 82 | 0.50-40 | 5-38 | 6-15 |
| Bing | 83 | 88 | 90 | 70 |
| Pchar | 82 | 68 | 45 | 38 |
| Pathchar | 80 | 62 | 45 | 32 |
| Clink | 78 | 48 | 47 | 43 |
| Pathrate | 98 | N/A | N/A | N/A |
| PathLoad | 95 | 87-90 | 64.20 - 92.40 | 0-3.3 |
| PathChirp | 73 | 65 | 66.5 | 66.5 |
| abget | 30-40U/50-60D | 20-30U/0-20D | 10-20U/20-40D | 40-50U/20-50D |

*FIG. 12*

| CBR/UDP Cross Traffic (Mbps) | 0 | 2 | 5 |
|---|---|---|---|
| LinkWidth | 9.6(I)/9.5(A) | 9.3(I)/7.4(A) | 4.6(I)/3.2(A) |
| Iperf | 8.5.1 | 6.2 | 3.53 |
| Bing | 10 | 7.5 | 5.8 |
| Pchar | 10 | N/A | N/A |
| Pathchar | 10 | 9.1 | 6.7 |
| Clink | 10 | 7.2 | 5.9 |
| Pathrate | 9.6 | 9.4-9.6 | 9.1-9.5 |
| PathLoad | 9.2 | 6.2 | 0-3.4 |
| PathChirp | 10 | 7-10 | 9.3-9.5 |
| abget | 10-90 U/0-10 D | 10-90 U/0-10 D | 10-90 U/0-10 D |

*FIG. 13*

| Bottleneck Link Capacity(Mbps) | 10 | 30 | 70 | 100 |
|---|---|---|---|---|
| LinkWidth | 9.6(I)/5.5(A) | 30(I)/24(A) | 70(I)/58(A) | 82(I)/75(A) |
| Iperf | 6.2 | 26 | 29-57 | 38-67 |
| Bing | 10 | 67 | 95 | 97 |
| Pathchar | 9.8 | 56 | 66 | 74 |
| Clink | 8.2 | 65 | 78 | 82 |
| Pathrate | 9.2 | N/A | N/A | N/A |
| Pathload | 7.2 | 22 | 50-80 | 85 |
| Pathchirp | 7-12 | 30-60 | 54 | 62.5 |
| abget | 10-90 U/0-10 D | 0-10 U/60-70 D | 0-10 U/10-70 D | 0-20 U/30-70 D |

| Conn./sec | 2 | 3 | 10 |
|---|---|---|---|
| LinkWidth | 2.9(I)/2.0(A) | 3(I)/1.08(A) | 2.8(I)/0.368(A) |
| Iperf | 2.57 | 0.991 | 0.406 |
| abget | 0-100 U/0-10 D | 0-100 U/90-100 D | 0-100 U/0-100 D |
| Conn./sec | 2 | 3 | 6 |
| LinkWidth | 4.8(I)/2.7(A) | 5.1(I)/2.3(A) | 4.95/0.864 |
| Iperf | 2.75 | 2.86 | 0.991 |
| abget | 0-100 U/70-90 D | 0-100 U/70-90 D | 0-100 U/10-30 D |
| Conn./sec | 2 | 5 | 10 |
| LinkWidth | 8(I)/4.8(A) | 9(I)/3(A) | 8/0.97(A) |
| Iperf | 5.49 | 2.3 | 0.862 |
| abget | 10-90 U/0-10 D | 10-90 U/0-10 D | 0-10 U/0-10 D |
| Conn./sec | 2 | 5 | 25 |
| LinkWidth | 48.6(I)/36(A) | 47(I)/12(A) | 37(I)/3(A) |
| Iperf | 27 | 5.2 | 1.2 |
| abget | 0-100 U/0-100 D | 0-100 U/0-100 D | 0-100 U/10-90 D |
| Conn./sec | 1 | 4 | 10 |
| LinkWidth | 95(I)/80(A) | 94(I)/21(A) | 94(I)/13(A) |
| Iperf | 74 | 22 | 10 |
| abget | 0-100 U/0-100 D | 0-100 U/0-100 D | 0-100 U/0-100 D |

| Tool Used | LinkWidth | Pathchar | Iperf |
|---|---|---|---|
| Host 1 | 62(I)/0.3(A) | 42 | 0.5 |
| Host 2 | 56(I)/1.03(A) | 35 | 0.6 |
| Host 3 | 5(I)/3.4(A) | 6 | 5.2 |

*FIG. 16*

| Tool Used | Iperf | Pathload | Linkwidth | Bottleneck Link |
|---|---|---|---|---|
| planetlab-1.cs.princeton.edu(US) | 36.5(UL)/19.5(DL) | 40 | 92(I)/18(A) | 216.27.100.53 |
| lefthand.eecs.harvard.edu(US) | 5.45(UL)/4.94(DL) | 84 | 94(I)/7(A) | 140.247.2.62 |
| planet1.pittsburgh.intel-research.net (US) | 11(UL)/0.728(DL) | 42 | 47(I)/12(A) | 128.59.255.89 |
| planetlab2.cis.upenn.edu(US) | 23(UL)/30(DL) | 97 | 80(I)/18(A) | 199.109.4.13 |
| planet3.berkeley.intel-research.net (US) | 2.6(UL)/0.707(DL) | 19 | 10(I)/3(A) | 128.59.255.14 |
| planet2.cc.gt.atl.ga.us(US) | 9.5(UL)/9.5(DL) | 95 | 76(I)/14(A) | 143.215.193.9 |
| planetlab2.cs.dartmouth.ed(US) | 0.25(UL)/0.2(DL) | 92 | 85(I)/0.15(A) | 192.5.89.218 |
| planetlab2.xeno.cl.cam.ac.uk(EUR) | 2.59(UL)/0.12(DL) | 96 | 93(I)/19(A) | 128.232.103.202 |
| planetlab-1.fokus.fraunhofer.de(EUR) | 0.2(UL)/1.98(DL) | 0.8 | 39(I)/0.172(A) | 199.109.4.13 |
| onelab1.inria.fr(EUR) | 1.94(UL)/1.92(DL) | 86-97 | 20(I)/3(A) | 138.96.250.190 |
| supernova.ani.uni vie.ac.at (EUR) | 2.13(UL)/0.7(DL) | 0 | 38(I)/1.1(A) | 131.130.32.152 |
| planetlab2.tmit.bme.hu(EUR) | 2.20(UL)/2.18(DL) | >94 | 84(I)/2(A) | 152.66.244.49 |
| planetlab-1.man.poznan.pl(EUR) | 2.15(UL)/2.15(DL) | 98 | 6.5(I)/2.1(A) | 150.254.210.61 |
| csplanetlab1.kaist.ac.kr(ASIA) | 1.4(UL)/1.2(DL) | 6 | 68(I)/1(A) | 199.109.7.13 |
| ds-pl3.technion.ac.il(ASIA) | 1.4(UL)/1.47(DL) | 97 | 70(I)/2.8(A) | 128.139.233.2 |
| sjtu2.6planetlab.edu.cn(ASIA) | 8(UL)/2(DL) | >17.38 | 75.5(I)/15(A) | 202.112.61.13 |

*FIG. 17*

SYSTEMS AND METHODS FOR COMPUTING DATA TRANSMISSION CHARACTERISTICS OF A NETWORK PATH BASED ON SINGLE-ENDED MEASUREMENTS

CROSS-REFERENCE TO RELATED APPLICATION

This application is a continuation of U.S. patent application Ser. No. 11/940,231, filed Nov. 14, 2007 now U.S. Pat. No. 7,660,261, which claims the benefit under 35 U.S.C. §119(e) of U.S. Provisional Patent Application No. 60/858,868, filed Nov. 14, 2006, which are hereby incorporated by reference herein in their entireties.

BACKGROUND

1. Technical Field

The present application relates generally to methods and systems for computing data transmission characteristics of network paths.

2. Related Art

The ability to accurately measure network parameters along Internet paths is useful to both Internet Service Providers (ISP) and end users. Internet paths between two hosts may traverse various ISP paths, with each ISP having multiple internal routes and multiple next-hop ISP and/or service level agreement (SLA) choices for the particular source and destination hosts. Therefore, in order to efficiently route data, an ISP must know the network parameters, such as the capacity and available bandwidth, of the different paths that connect the source and destination hosts. End users also find such network parameters useful in order to, for example, select between two mirror sites of a particular host to find the most efficient connection.

In general, a network path between a sender and a receiver will include a number of links (or "hops") between intermediate hosts, or more specifically, intermediate routers. Each link has a capacity, which is the maximum possible data transmission rate, and an available bandwidth, which is the unused portion of the capacity in the presence other users' data, i.e., cross traffic. The available bandwidth of a link for a particular application depends on a number of factors, including the characteristics of the application itself, the protocols used, and the characteristics of the cross traffic and routers, all of which makes accurate measurement of available bandwidth difficult. Cross traffic varies over time, making available bandwidth even more difficult to measure. A bottleneck link bandwidth may be defined as the available bandwidth of the slowest (i.e., narrowest bandwidth) forwarding element (e.g., router) of the network path. Bottleneck capacity may be defined as the narrowest bandwidth in the absence of cross traffic. Bottleneck bandwidth and capacity are sometimes referred to as "end-to-end" available bandwidth or capacity.

SUMMARY

Systems and methods are provided for computing data transmission characteristics of a network path based on single-ended measurements. In one aspect, the disclosed embodiments provide a method for computing a capacity of a network path are provided. The method includes sending a packet train from the sending host. The packet train includes at least one TCP packet of a first type at a head end of the packet train, each head end packet being addressed to an unused port on a different router along the network path; and at least one TCP packet of the first type at a tail end of the packet train, each tail end packet being addressed to an unused port on a different router along the network path, such that there is one head end packet and one tail end packet addressed to each router along the network path, including the router of the receiving host. The packet train further includes a plurality of TCP packets of a second type as load packets between the head end and the tail end, wherein the TCP packets of the first type result in a reply from the routers, and the TCP packets of the second type do not result in a reply from the routers.

The method further includes receiving, from each router along the network path, a first reply TCP packet of a third type in response to a head end packet and a second reply TCP packet of the third type in response to a tail end packet; determining a time delay between the first and second reply packets received from each router; and determining a dispersion value for each router based on the corresponding time delay of the router. An estimated capacity of the network path is computed by dividing the length of the packet train by the maximum of the dispersion values.

In another aspect, the disclosed embodiments provide a method that includes determining a target offered rate between a minimum offered rate and a maximum offered rate; and sending a packet train, having the target offered rate, from the sending host. The packet train includes a TCP packet of a first type at a head end of the packet train, addressed to an unused port on a router of the receiving host; and a TCP packet of the first type at a tail end of the packet train, addressed to an unused port on a router of the receiving host. The packet train further includes a plurality of pairs of TCP packets of a second type as load packets between the head end and the tail end, each of the pairs of load packets having an intra-pair gap there between, and each of the pairs of load packets having an inter-pair gap with respect to neighboring pairs of load packets or the head end or tail end packet, wherein the TCP packets of the first type result in a reply from the router of the receiving host, and the TCP packets of the second type do not result in a reply from the router of the receiving host.

The method further includes receiving, from the router of the receiving host, a first reply TCP packet of a third type in response to the head end packet and a second reply TCP packet of the third type in response to the tail end packet; determining a time delay between the first and second reply packets; determining a received dispersion value based on the time delay between the first and second reply packets; and determining whether a ratio of the received dispersion value to a sending dispersion value is equal to one, within a predetermined error range. The method further includes setting the minimum offered rate equal to the target offered rate, if the ratio of the received dispersion value to the sending dispersion value is determined to be equal to one, within the predetermined error range; and setting the maximum offered rate equal to the target offered rate, if the ratio of the received dispersion value to the sending dispersion value is determined not to be equal to one, within the predetermined error range. The method further includes repeating the preceding steps until the difference between the minimum offered rate and the maximum offered rate is less than a predetermined threshold. An estimate of available bandwidth is determined based on at least one of the minimum offered rate and the maximum offered rate.

In another aspect, the disclosed embodiments provide a method that includes determining if a window size is less than a threshold, the window size specifying a number of packets; doubling the window size, if it is determined that the window size is less than the threshold; and increasing the window size by one, if it is determined that the window size is less than the threshold. The method further includes sending a packet train, having a length equal to the window size, from the sending host. The packet train includes a TCP packet of a first type at a head end of the packet train, addressed to an unused port on a router of the receiving host; and a TCP packet of the first type at a tail end of the packet train, addressed to an unused port on a router of the receiving host. The packet train further includes a plurality of TCP packets of a second type as load packets between the head end and the tail end, wherein the TCP packets of the first type result in a reply from the router of the receiving host, and the TCP packets of the second type do not result in a reply from the router of the receiving host.

The method further includes receiving, from the router of the receiving host, a first reply TCP packet of a third type in response to the head end packet and a second reply TCP packet of the third type in response to the tail end packet; determining if the first and second reply packets have been received correctly by the sending host; and setting the threshold equal to a preceding window size, which is the window size prior to the most recent doubling or increasing of the window size, if it is determined that at least one of the first and second reply packets have not been received correctly by the sending host. The method further includes determining an estimate of available bandwidth based on the window size; and repeating the preceding steps until the estimate of available bandwidth remains constant for a predetermined number of iterations.

BRIEF DESCRIPTION OF THE DRAWINGS

The disclosed embodiments will be more readily understood from a detailed description of the preferred embodiments taken in conjunction with the following figures.

FIG. 12 shows in-lab experimental results obtained from the measurement of installed and available capacity of a slow link using various tools and by varying the CBR/UDP cross-traffic.

FIG. 13 shows in-lab experimental results obtained from the measurement of installed and available capacity of a slow link using various tools and by varying the CBR/UDP cross-traffic.

FIG. 14 shows in-lab experimental results obtained from measuring installed and available capacity in the presence of elastic long lived connections.

FIG. 15 shows in-lab experimental results in which the cross-traffic is due to multiple simultaneous TCP connections.

FIG. 16 shows experimental results for measuring the installed and available capacity of hosts connected to the Internet.

FIG. 17 shows experimental results for measuring the installed and available capacity of hosts connected to the PlanetLab network.

DETAILED DESCRIPTION

Figure 1:
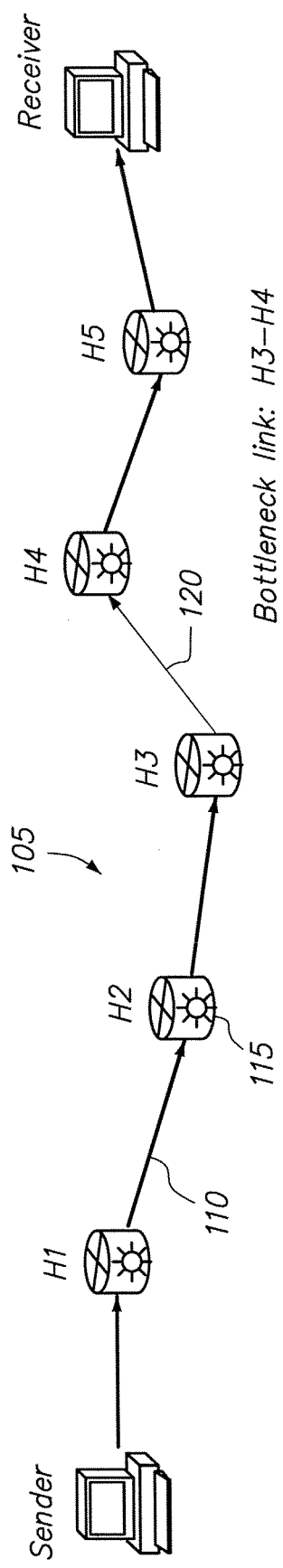
FIG. 1 shows an example of a multi-hop network path between a sending host and a receiving host.

As shown in FIG. 1, a network path 105 between a sender and a receiver generally will include a number of links 110 (or "hops") between intermediate hosts, or more specifically, intermediate routers 115. Each link has a capacity, which is the maximum possible data transmission rate, and an available bandwidth, which is the unused portion of the capacity in the presence other users' data, i.e., cross traffic. Measuring capacity and available bandwidth quickly and accurately is important for efficient network control and operation, particularly for applications that require a specific level of quality of service (QoS), because it allows timely corrective action to be taken if the network parameters fall below a threshold.

In general, one of the links of a network path will have the narrowest bandwidth and therefore will determine the end-to-end capacity of the path. Similarly, one of the links will have the least available bandwidth (the "tightest" link) and therefore will determine the end-to-end available bandwidth of the path. The narrowest link and the tightest link may be one in the same, but this is not necessarily the case. In the example of FIG. 1, the link 120 between H3 and H4 is the narrowest link. Knowing the location of the bottleneck link and its available bandwidth can help network operators to reconfigure the network routing to reduce or eliminate such bottlenecks and improve overall network efficiency. This information also helps Internet service providers (ISPs) to perform network capacity planning.

One technique for measuring end-to-end bottleneck capacity, "Pathneck", uses a recursive packet train, which is a train of load packets which are appended and prepended by a sequence of measurement packets. The load packets are user datagram protocol (UDP) packets, and the measurement packets are Internet control message packets (ICMP) that are set to have incrementally increasing or decreasing time-to-live (TTL) values. At each router in the network, the TTL field is decremented by one. When the TTL reaches zero, the packet is viewed as expired by the router, and a reply is sent back to the sender. Thus, at each router, one head packet and one tail packet will result in a reply to the sender. The maximum time difference, i.e., dispersion, between the replies sent back to the sender is used to identify the bottleneck link and estimate the bottleneck capacity. Simpler techniques also exist for estimating capacity, which use packet pairs, instead of packet trains. Among the disadvantages of this technique is that ICMP packets are treated with lower priority at routers than other types of packets. Therefore, these packets may experience longer queuing delays, which may result in an underestimation of available bandwidth. Furthermore, each of the UDP load packets results in a ICMP Destination Host Unreachable packet being sent back to the receiver, which generates significant cross traffic in the reverse path.

In general, techniques for estimating available bandwidth rely on sending pairs or trains of packets that have an initial dispersion and measuring the dispersion of the received packets. If the received dispersion equals the sending dispersion, then it can be assumed that the sending data rate is within the available bandwidth, because there has been no queuing delay at any of the routers. If, on the other hand, the received dispersion is greater than the sending dispersion, then the available bandwidth likely has been exceeded.

In the Self-Loading of Periodic Streams (SLoPS) technique, the source sends a periodic packet stream to the receiver at a certain stream rate. If the stream rate is greater than the path's available bandwidth, then the stream will cause a short term overload in the queue of the bottleneck link. One way delays of the probing packets will keep increasing as each packet of the stream queues up at the bottleneck. If, on the other hand, the stream rate is less than the available bandwidth, then no such increase in one-way packet delay will occur. The sender attempts to bring the stream rate as close to the available bandwidth as possible using an iterative technique, while the receiver notifies the sender of the one-way delay trend of each stream. Of course, does not allow one-ended measurement of available bandwidth, because it requires a cooperating receiver to measure the one-way delay.

In the Train of Packet Pairs (TOPP) technique, packet pairs are sent at linearly increasing rates from the sender to the receiver. If the sending rate is less than the available bandwidth, then the measured rate at the receiver will be equal to the sending rate. If, on the other hand, the sending rate is greater than the available bandwidth, then the rate measured at the receiver will be less than the sending rate, due to queuing delays. TOPP can also estimate the bottleneck capacity of the tight link of the path. This technique, also, requires a cooperating receiver to measure received data rate.

Figure 2:
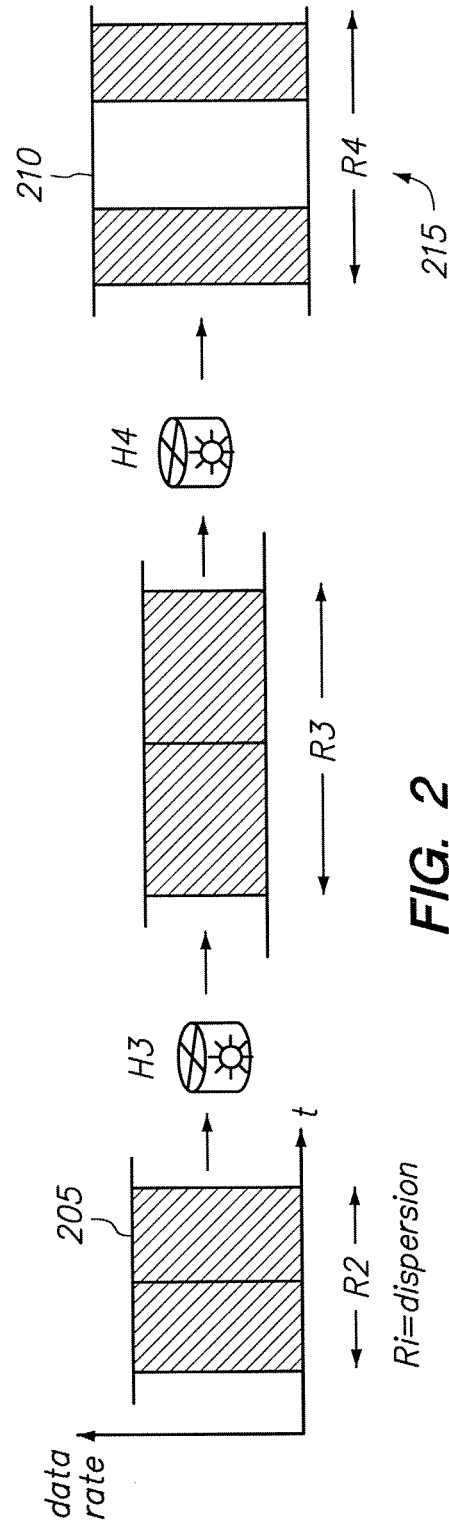
FIG. 2 illustrates how bandwidth differences among links in the network path can result in changes in the dispersion of packets traversing the network path.

FIG. 2 illustrates how bandwidth differences among links in the network path can result in changes in the dispersion of packets traversing the network path, i.e., the length of time between the leading and trailing edges of the packets. For example, two packets 205, with no gap between them, have a dispersion (R2) equal to the length of the two packets combined. In general, however, there may be a gap between the two packets, the length of which is included in the dispersion measurement of the packet pair. As the two packets pass through the "bottleneck" link between H3 and H4, the data rate decreases due to queuing delay at the router in H3, resulting in an increase in the dispersion (R3) of the two packets. When the data rate increases as the packets enter the link between H4 and H5; the data rate of the first packet increases first, leaving a gap between the first and second packets. While the dispersion 210 of each individual packet decreases in the link between H4 and H5, the total dispersion 215 of the pair (R4) remains constant. Thus, the dispersion measured at the receiver is a maximum dispersion for the entire path, which corresponds to the bandwidth of the narrowest link.

From this example, it can be seen that capacity and available bandwidth of a path can be estimated by sending a packet pair with a known initial dispersion $R_o$ from a sending end to a receiving end and measuring the received dispersion $R_m$. If the received dispersion $R_m$ equals the sending dispersion $R_o$, then sending data rate is within the available bandwidth, because no queuing delay is experienced by the packet pair. If the received dispersion $R_m$ exceeds the sending dispersion $R_o$, then sending data rate is greater than the available bandwidth.

Measurements of capacity and available bandwidth can be made relatively easily in a local area network, because one generally has access to the entire network and has information regarding its topology and important parameters. Thus, one can employ two-ended measurement techniques, which require operation of a sending host and a receiving host. However, the scale and complexity of large, non-proprietary networks, such as the Internet, makes the task of understanding and analyzing their properties extremely difficult. The diffuse style of administration and operation of the Internet means that even such basic information as topology and link capacity is spread across multiple entities with little incentive to share it. For example, there is little information available on the distribution of Internet access-link capacities and available bandwidths for end-users. Also, a user generally will not have access to both ends of a particular link on which data is to be transmitted. However, if users can accurately determine link capacities and available bandwidths for different network paths using single-ended techniques, then these measurement results can be used as part of a selection process of an access link, an appropriate replica server of a distributed service such as a web server, a digital media/content provider, etc. Thus, it is desirable to have single-ended techniques for accurately measuring capacity and available bandwidth in network paths.

Figure 3:
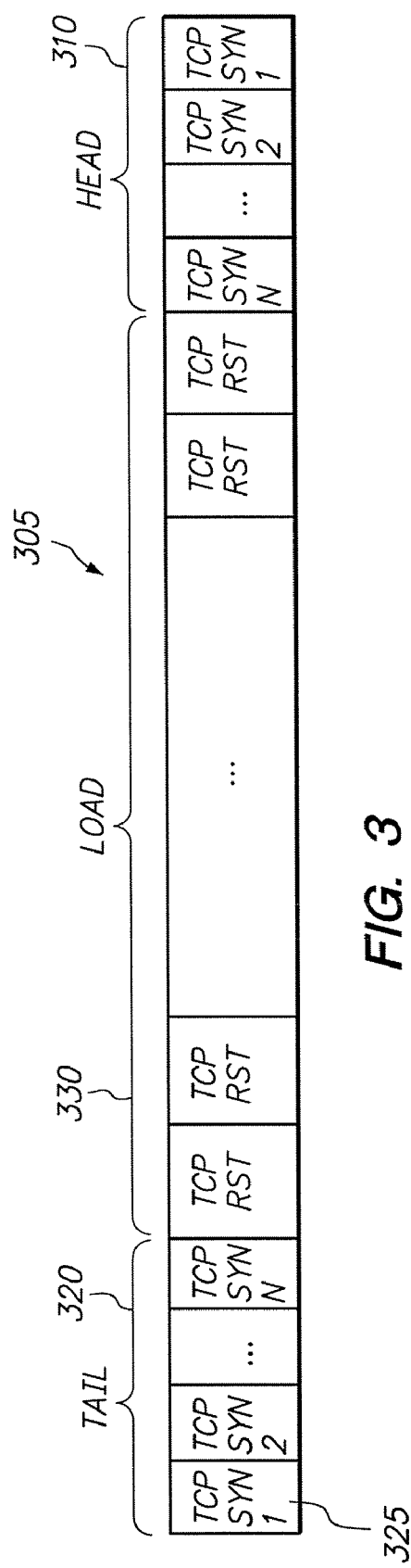
FIG. 3 shows an example of a packet train for use in a single-ended measurement system for measuring estimated bottleneck capacity of a network path, according to an embodiment of the disclosed subject matter.

The packet train shown in FIG. 3 can be sent from the sending end to the receiving end to estimate the bottleneck capacity of the path with a single-ended measurement system. The packet train includes a head portion 310 and a tail portion 320 formed of TCP synchronize (SYN) 325 packets, which are ordinarily used to open a connection. The TCP SYN packets are sent to TCP ports that, on most operating systems, will have no service running. Receiving a TCP SYN at an unused port causes the receiving host to send back a TCP reset plus acknowledgment (RST+ACK). One advantage of the packet train shown in FIG. 3 is that the TCP SYN packets are given the same priority as ordinary network traffic, whereas conventional techniques rely on ICMP packets, which are given a lower priority by most commercial routers and therefore experience additional delay, which affects the capacity measurement.

Using a packet train 305, such as the one shown in FIG. 3, to measure capacity is advantageous over a packet pair, because a large packet size (which would be required for high sending rates) may lead to bandwidth underestimation, due to large queuing delays and the possible insertion of cross traffic between the packet pairs. Likewise, small packet sizes may result in bandwidth overestimation. A packet train having a large number of closely-spaced packets tends to obviate these overestimations and underestimations.

Each of the consecutive SYN packets in the train is sent to a consecutive intermediate router along the path to the destination and to the receiving end host. Prior to configuring the packet train, the IP address of each intermediate router must be determined, for example, using traceroute, which sends a sequence of ICMP packets having time-to-live (TTL) values set to consecutively decreasing values. This causes the ICMP packets in the sequence to expire at consecutive intermediate routers, which results in a ICMP Destination Unreachable packet being returned from each intermediate router. Based on these received packets, the topology of the path can be determined, and thus, the number of TCP SYN packets required for the head and tail of the capacity measurement packet train can be determined, as well as the IP destination address for each SYN packet of the packet train.

To make the reply packets easier to distinguish, each of the SYN packets is addressed to a different unused TCP port, in the following manner. Starting with a certain base TCP port number (BASF_PORT), each of the consecutive SYN packets in the head of the train are addressed to consecutive even port numbers: BASE_PORT+2, BASE_PORT+4, BASE_PORT 6, . . . BASE_PORT+2N. Thus, a packet addressed to BASE PORT+2 is easily identifiable as the packet sent to the first router in the path, a packet addressed to BASE_PORT+4 is identifiable as the packet sent to the second router, etc., with packet addressed to BASE PORT+2N being identifiable as the one sent to the destination host. This arrangement forms the head measurement packets of the packet train, which is followed by the TCP RST load packets 330, and then the tail measurement packets, which are similarly configured using odd port numbers. Specifically, the tail measurement packets use destination port numbers: BASE PORT+3, BASE_PORT+5, . . . BASE_PORT+2N+1, etc., with the packet addressed to port BASE_PORT+2(N−1)+1 being the one sent to the destination host.

This port addressing procedure makes it possible to distinguish the packets from each of the intermediate routers based on the source port numbers of the reply TCP RST+ACK, rather than having to use the IP addresses. To measure the end-to-end dispersion of the packet train, a packet with an odd-numbered source port is matched with a packet having the next consecutive even-numbered source port address, and the time lag between them (and hence the dispersion) is computed using the gettimeofday( ) function. The end-to-end capacity of an m-link network path is given by: $C=L/\max(R_1, R_2, \ldots R_m)$, where L is the length of the packet train in bits, and $R_1, R_2, \ldots R_m$ are the computed values of dispersion for each of the links in the path.

The train of packets is configured to cause congestion on the path, thereby "pushing" out other traffic (i.e., cross traffic), which allows for a more accurate measurement of the capacity of the path at it its narrowest point. The train includes a payload portion formed from TCP reset (RST) packets 335, which load the path, but do not elicit replies from the receiving end and intermediate routers. Thus, the TCP RST packets help achieve congestion in the sending direction in order to accurately measure capacity, but do not significantly load the return path, thereby reducing reverse cross traffic and diminishing interference with the TCP RST+ACK packets being sent back from the receiving end and intermediate routers.

The example discussed above uses TCP SYN packets to elicit a TCP RST+ACK reply from the routers along the network path, and uses TCP RST load packets, which do not cause a reply to be sent back from the receiving routers. However, other types of packets also could be used to achieve the same behavior of the receiving routers. For example, TCP FIN or TCP NULL packets could be used instead of TCP SYN packets in the head and tail portion of the packet train, because these types of TCP packets cause a response packet to be sent back from the receiving router.

Figure 4:
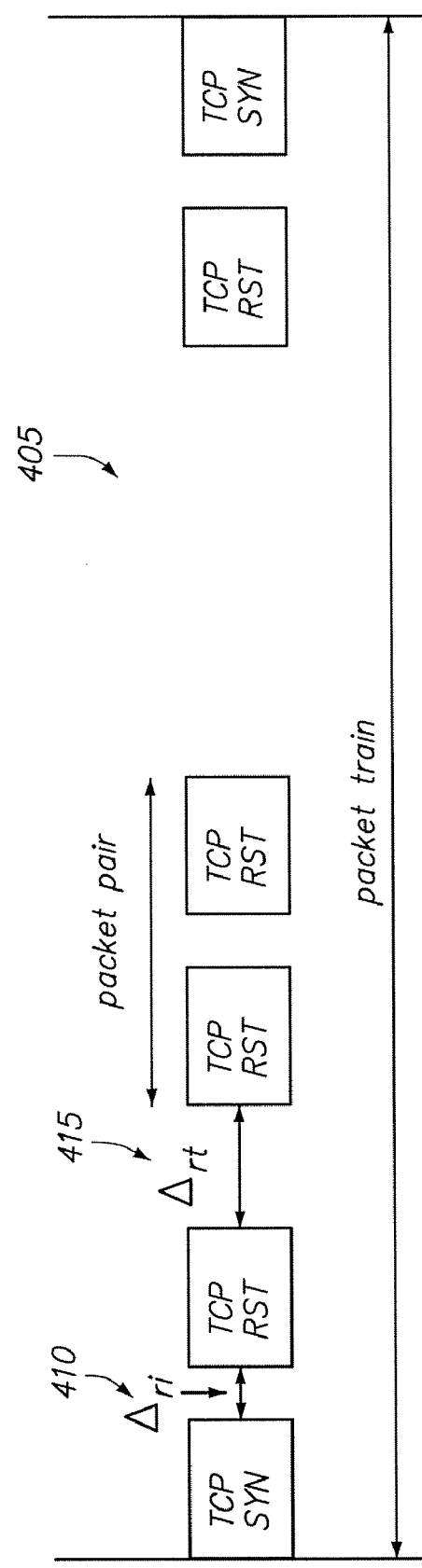
FIG. 4 shows an example of a packet pair train for use in a single-ended measurement system for measuring estimated available bandwidth in a network path, according to an embodiment of the disclosed subject matter.

As discussed above, the available bandwidth of a path can be estimated by sending a packet pair with a known initial dispersion $R_o$ from a sending end to a receiving end and measuring the received dispersion $R_m$. FIG. 4 shows an example 405 of a packet pair train that may be used to measure available bandwidth based on this principle, but in a single-ended measurement system. As in the case of capacity measurements, using a packet pair train is advantageous over using packet pairs, because error due to cross traffic between the packet pairs is avoided. Furthermore, large packet sizes (which would be required for packet pairs at high offered rates) may lead to bandwidth underestimation, due to large queuing delays, which may result in cross traffic being inserted between the packet pairs. Likewise, small packet sizes may result in bandwidth overestimation. A packet pair train having a large number of closely-spaced packet pairs tends to obviate these overestimations and underestimations.

The packet pair train is formed of m pairs of TCP RST packets, in this example, with a TCP SYN packet at the head and tail end. Alternatively, there may be a number of TCP SYN packets at the head and tail ends, arranged as discussed above with respect to FIG. 3. There is a gap of length $\Delta r_i$ 410 (the intra-pair gap) between the two individual packets of each pair of packets. There is a gap of length $\Delta r_1$ 415 (the inter-pair gap) between each packet pair and the neighboring packet pairs. The dispersion of the entire train is given by: $R_o = m \cdot \Delta_1 + (m-1) \cdot \Delta r_t + 2 \cdot m \cdot PST$, where PST is the packet send time. The offered rate, i.e., the sending data rate, is given by: $OFRR = (TrainLen \cdot 8)/R$, where TrainLen is the length of the packet train in bytes. Thus, the offered rate OFRR can be controlled by the intra-pair gap $\Delta r_i$ or the inter-pair gap $\Delta r_t$. In practice, it has been found to be preferable to use the intra-pair gap $\Delta_i$ to control the offered rate OFRR, using the relationship: $\Delta r_i = (TrainLen \cdot 8)/(OFFR \cdot m) - (\Delta r_t + 2 \cdot PST)$, assuming that for large values of m: m≈m−1.

A system called nanosleep( ) is used to provide precise inter-pair gap and intra-pair gap delays in order to achieve more accurate control of the offered rate. The process scheduling is switched to real-time SCHED_FIFO with highest scheduling priority, which gives maximum CPU time slices to the process, as compared to conventional SCHED_OTHER non-real-time, Round Robin scheduling. Small delays of less than 2 microseconds are implemented as busy waiting loops. This technique works well in certain operating systems, such as, for example, Linux 2.4. It is worth noting that Linux 2.6 may switch a task to sleep state, which can cause a dispatch latency of as high as 10 microseconds and hence fail to ensure real-time delays. The high-res timers feature (CONFIG_HIGH_RES_TIMERS) enables POSIX timers and nanosleep( ) to be as accurate as the hardware allows (around 1 microsecond on typical hardware). This feature is transparent-if enabled, it makes these timers much more accurate than HZ resolution.

Figure 5:
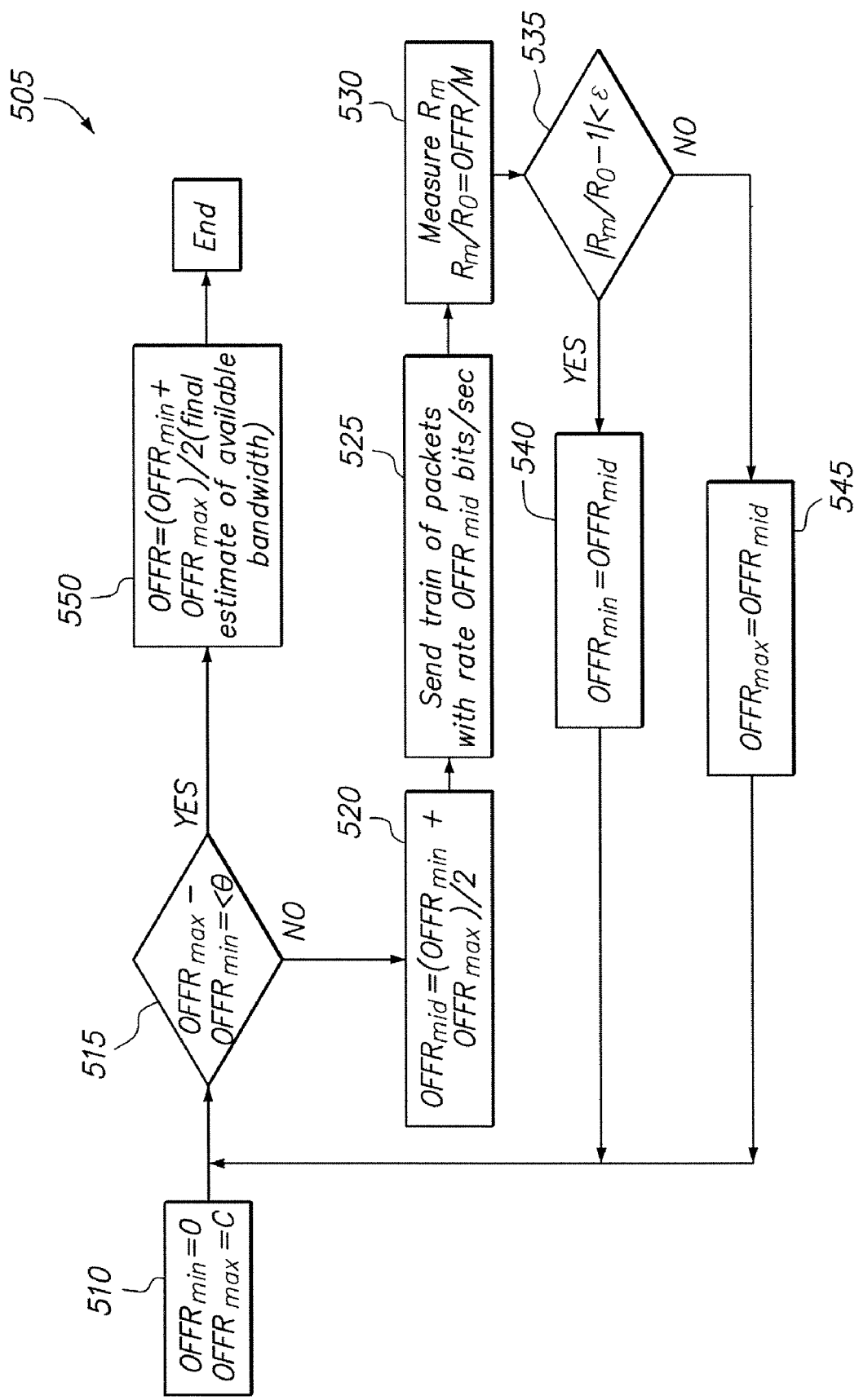
FIG. 5 is an embodiment of a method for determining estimated available bandwidth in a network path using the packet pair train of FIG. 4.

FIG. 5 shows the algorithm 505 used to determine available bandwidth using a packet pair train of the type shown in FIG. 4. As an initial step 510, a minimum and maximum value are established for the offered rate OFRR (sending rate) of the packet pair train. The minimum offered rate $OFRR_{min}$ is initially set to zero, and the maximum offered rate $OFRR_{max}$ is initially set to the estimated capacity C, which is obtained using the packet train technique described above with respect to FIG. 3, or using the TCP SYN packets of the packet pair train itself to estimate capacity (as noted above, the packet pair train may have an arrangement of TCP SYN packets at the head and tail ends similar to that shown in FIG. 3). Alternatively, the capacity C may be roughly estimated from the known rated capacity of the link. In general, it is better to use an estimate for C that is too high, which may slightly increase the convergence time of the algorithm, than to use an estimate for C that is too low, which may cause the algorithm not to converge.

After the values of $OFRR_{min}$ and $OFRR_{max}$ are initialized, the difference between these values is compared to a capacity estimation granularity parameter θ 515, which may be chosen based on desired performance characteristics. For larger links, such as institutional Internet links, the value of θ may be chosen to be on the order of a megabyte, whereas for smaller links, such as for home use, the value of θ may be chosen to be on the order of a few kilobytes. If the difference between $OFRR_{min}$ and $OFRR_{max}$ is not less than or equal to θ 515, which is usually the case at the start of the algorithm, then a mid-point offered rate is computed as follows: $OFRR_{mid}=(OFRR_{min}+OFRR_{max})/2$ 520, and a packet pair train having this offered rate is sent 525.

It is then determined whether the packet train sent at the newly computed offered rate $OFRR_{mid}$ a exceeds the available bandwidth, which means that the dispersion at the received end $R_m$ is greater than the dispersion at the sending end $R_o$. If $OFRR_{mid}$ does not exceed the available bandwidth, then the dispersion at the received end $R_m$ is equal to the dispersion at the sending end $R_o$. As discussed above, the TCP SYN packets on the head and tail ends of the packet train result in TCP RST+ACK packets being sent back from the receiving end and the routers along the path. These TCP RST+ACK packets do not experience significant increase in dispersion in transit from the receiving end (and intermediate routers) back to the sending end, because they travel back alone, rather than as part of a loaded packet train, and therefore do not contribute significantly to queuing delay. Thus, the relationship between the dispersion at the receiving and sending ends may be ascertained using only single-ended measurements at the sending end, based on the following relationship: $R_m/R_o=1=OFFR/M$, where M is the measured reception 530 rate (which may be measured directly in techniques using a cooperative receiving end).

If the ratio $R_m/R_o$ is equal to unity 535, within a specified error c, then the available bandwidth has not been exceeded. This may be expressed as: $\epsilon > |R_m/R_o-1|$. The value of $\epsilon$ may be chosen based on desired performance characteristics, such as convergence time. In this case, the next offered rate to be transmitted is increased by setting the bottom of the offered rate range $OFFR_{min}$ equal to $OFFR_{max}$ 540. If the value of $R_m/R_o-1$ is outside of the specified error bound, then the available bandwidth has been exceeded. In this case, the next offered rate to be transmitted is decreased by setting the top of the offered rate range $OFFR_{max}$ equal to $OFFR_{mid}$ 545. In either case, following the change in the offered rate range, the difference between $OFRR_{min}$ and $OFRR_{max}$ is again compared to the capacity estimation granularity parameter θ 515. These iterations continue until the difference between $OFRR_{min}$ and $OFRR_{max}$ is less than θ, in which case the final value of OFFR is set equal to the mean of $OFRR_{min}$ and $OFRR_{max}$ 550. The final value of OFFR is the available bandwidth estimate.

The estimate of end-to-end available bandwidth described above is a conservative estimate, because the threshold (OFFR/M≈1), between the available bandwidth and the bandwidth considered to be occupied, assumes that there should be no queuing at intermediate hosts (which causes the increase in dispersion at the receiving end). As a practical matter, the available bandwidth of an end-to-end Internet protocol (IP) path, from the perspective of Internet protocols such as TCP, will be greater than this estimate. One reason for this is that these protocols evaluate available bandwidth assuming a finite queue, rather than no queuing, and they account for these queuing delays in the measurement of the available bandwidth. Moreover, in a noisy, bursty network like the Internet, the goal of no dispersion between the sending and receiving ends (OFFR/M≈1) is difficult to achieve, and an estimate of available bandwidth based on this threshold results in a lower bandwidth than is actual useful bandwidth, because the path can actually successfully deliver many more packets correctly than this estimated bandwidth indicates. Specifically, TCP and related protocols define available bandwidth as the maximum possible number of bits correctly sent to the receiver per unit time. However, the available bandwidth estimate described above is a good estimate of jitter-free bandwidth, which may be useful for time-constrained applications, such as multimedia applications.

Figure 6:
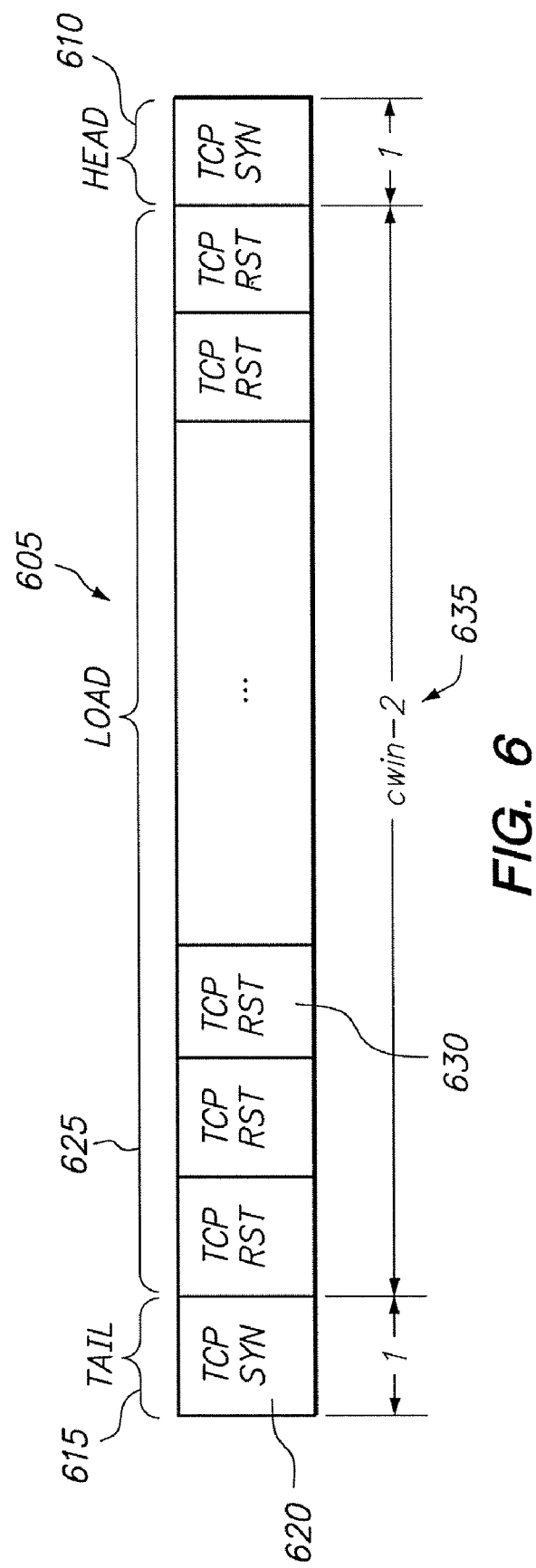
FIG. 6 shows an example of a variable length packet train for use in a single-ended measurement system for measuring estimated available bandwidth in a network path, according to an embodiment of the disclosed subject matter.

A less conservative estimate of available bandwidth may be achieved using the variable length packet train structure 605 shown in FIG. 6, which is used in a single-ended measurement system in an algorithm that seeks to ramp up the sending rate and observe how much of the data is correctly delivered to the receiver. The packet train includes a head portion 610 and a tail portion 615, each formed of a TCP synchronize (SYN) packet 620, which is addressed to an unused TCP port at the receiving end. Upon receiving these packets, the receiving host sends back a TCP reset plus acknowledgment (RST+ACK). The train includes a payload portion 625 formed from TCP reset (RST) packets 630, which load the path, but do not elicit replies from the receiving end and intermediate routers.

The number of RST packets in the payload is controlled by the congestion window (cwin) TCP parameter. There are cwin packets in the entire train, which means there are cwin−2 635 payload RST packets. The congestion window TCP parameter is ordinarily used by TCP senders in the "slow start" algorithm, which is used to control sending rates between Internet hosts. In slow start, when a new connection is established with a host, cwin is initialized to one packet. Each time an acknowledgement (ACK) is received, cwin is increased by one packet, so on the second iteration, two packets are sent. When each of these two packets is acknowledged, the congestion window will be increased by two packets (one for each received ACK) to four packets. Thus, the increase in cwin is exponential.

At some point, the capacity of the path will be reached and an intermediate router will start discarding packets, which will result in a timeout indication at the sender. In a typical slow start algorithm, a TCP parameter called the slow start threshold (ssthresh) will then be set to one-half of the current value of cwin, and cwin will be reset to one packet (the value of ssthresh is initially set to 65,535 bytes, which is the maximum TCP window). The slow start algorithm is then restarted. However, now when cwin reaches ssthresh, the exponential increase in cwin will be changed to a linear increase, so that the apparent bandwidth limit is approached more slowly. The operation of the algorithm during the linear increase is referred to as "congestion avoidance".

Some types of TCP senders, e.g., "Westwood" senders, follow a different congestion avoidance algorithm. A Westwood sender employs an additive increase, adaptive decrease, algorithm, which means that ssthresh is not set to one-half the current value of cwin when a timeout occurs, but is instead reduced by an amount less than that, based on a measured bandwidth indication. This results in an algorithm that is more "aggressive" in the sense that it does not take as much time to ramp back up the sending rate after congestion is encountered.

Figure 7:
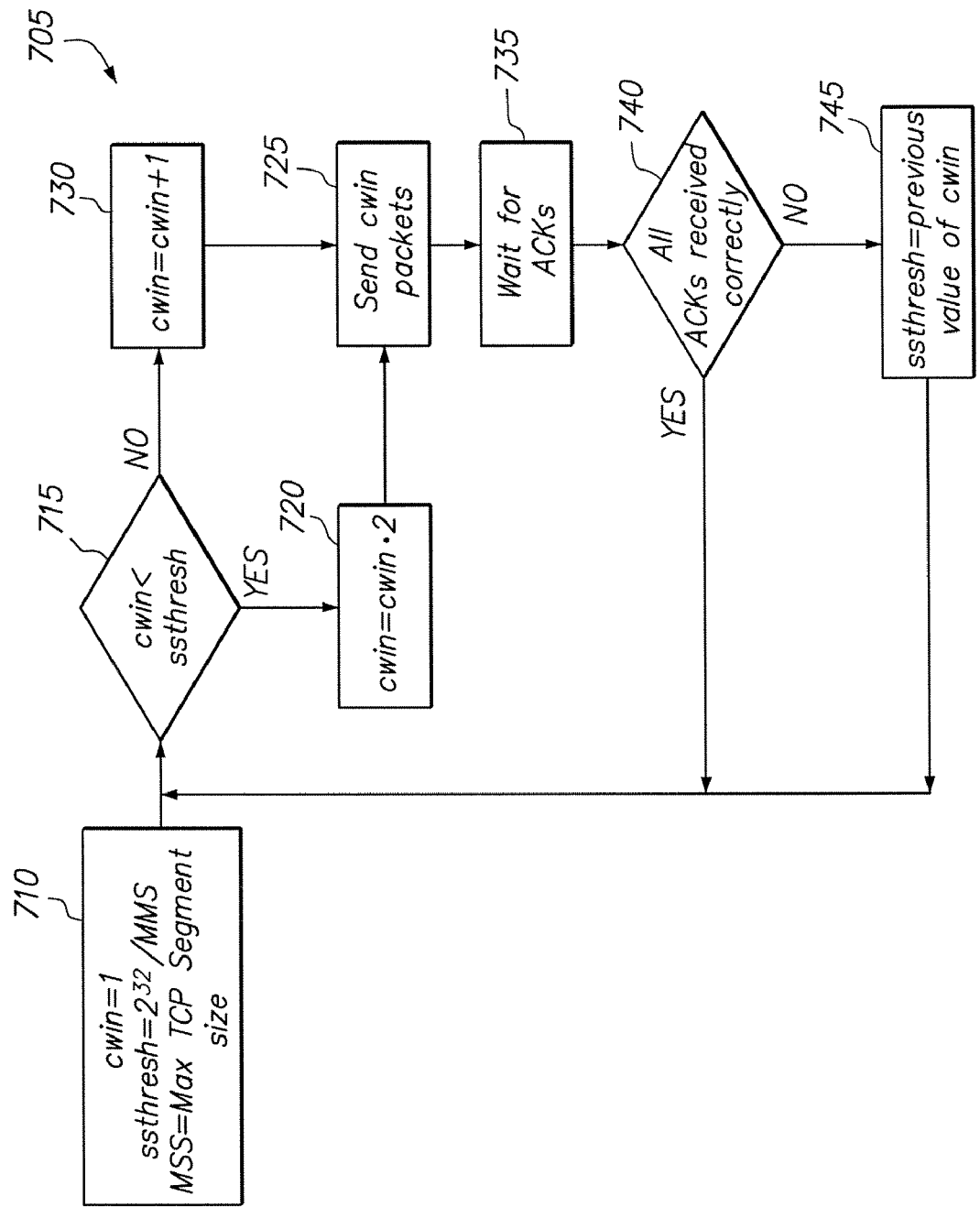
FIG. 7 is an embodiment of a method for determining estimated available bandwidth in a network path using the packet pair train of FIG. 6.

FIG. 7 illustrates an algorithm 705 for estimating available bandwidth that uses the variable length packet train discussed above (see FIG. 6) along with slow start/congestion control parameters to control sending rate. The algorithm is single-ended, i.e., it does not require a cooperative receiver.

Although, it is assumed that the receiving hosts have a functional TCP/IP stack, which means that they will reply to TCP SYN packets with a TCP RST+ACK. As in the slow start algorithm, the value of cwin is started at one packet, and ssthresh is started at the maximum TCP window size, which is given by: ssthresh=$2^{32}$/MSS, where MSS is the maximum TCP segment (packet) size (typically close to 1500 bytes) 710.

If cwin is less than ssthresh 715, then cwin is doubled 720, and a packet train of cwin packets is sent 725. The sending rate of this packet train is taken to be the current estimate of available bandwidth. If cwin is greater than ssthresh, then cwin is increased by one 730, and a packet train of cwin packets is sent 725. If all ACK packets are correctly received, then the algorithm restarts 740. If all of the ACK packets are not correctly received, e.g., if a timeout occurs or if duplicate ACK packets are received, then the value of ssthresh is adjusted downward to the previous value of cwin 745, which corresponds to the previous estimate of available bandwidth. Once the value of cwin has settled to a particular value for a predetermined number of iterations, the sending rate of this packet train is taken to be the current estimate of available bandwidth.

As noted above, this decrease in ssthresh is not as precipitous as in some slow start/congestion avoidance algorithms that reduce it to one half of the congestion window. Therefore, the method described above, with respect to FIGS. 6 and 7, converges on an accurate estimate of available bandwidth faster than such algorithms. As such, the disclosed embodiments can measure bandwidth relatively quickly, which can enhance its applicability to scenarios that use available bandwidth measurements to adapt their transmission rate.

Another way of converging more quickly on an estimate of available bandwidth is to use an estimate computed from the packet pair train technique discussed above (see FIG. 4) to compute an initial value for cwin, instead for starting cwin at one. This initial value for cwin can be based on the delay-bandwidth product, which is a measure of the capacity of the path in bits: CAP=bandwidth·RTT, where CAP is the capacity of the path (in bits), bandwidth is the available bandwidth (in bits/second), and RTT is the round-trip time (in second), which is the time required for a packet to travel from the sender to the receiver and back. The values of bandwidth and RTT are determined from the packet pair train measurements discussed above. Because the available bandwidth estimated using the packet pair train technique is considered to be a conservative estimate, it can safely be used as starting point for cwin. Thus, the initial value of cwin is given by: cwin=CAP/MSS, where MSS is the maximum TCP segment (packet) size (typically close to 1500 bytes).

Figure 8:
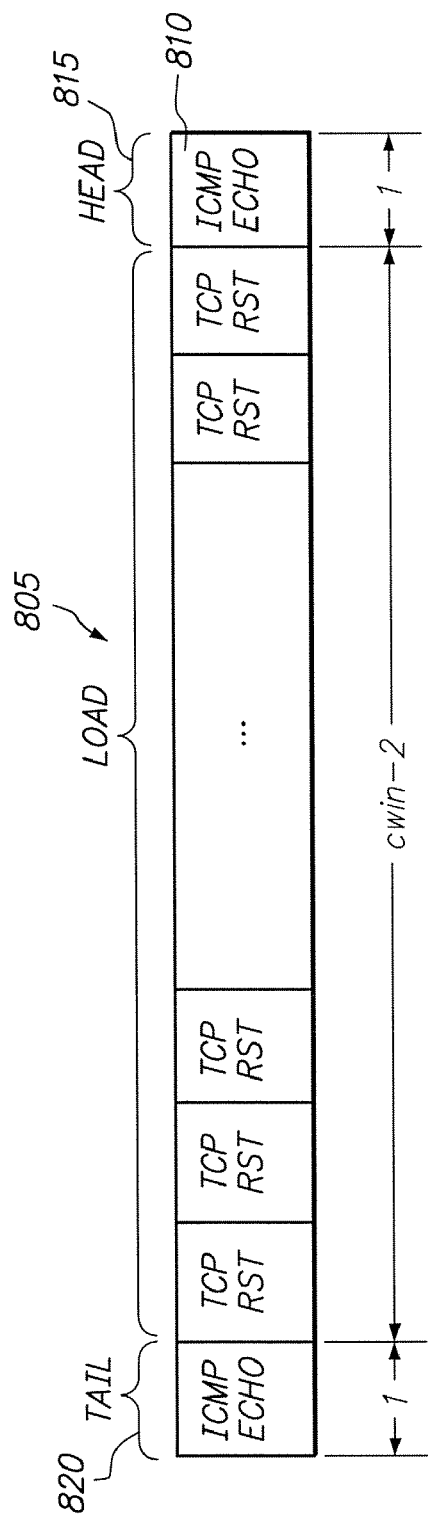
FIG. 8 shows an example of a variable length packet train for use with hosts that do not support replying to TCP SYN packets sent to unused ports, according to an embodiment of the disclosed subject matter.

FIG. 8 shows an alternative packet train configuration 805 that can be used for this technique for hosts that do not support replying to TCP SYN packets sent to unused ports. For example, a host may have a firewall that blocks SYN packets to unused ports. In such a case, ICMP ECHO 810 packets may be used for the head 815 and tail 820 of the packet train, instead of TCP SYN packets. The ICMP ECHO packets will elicit an ECHO reply packet from the receiving end, and these replies may be used in a manner analogous to the TCP RST+ACK packets sent in reply to the TCP SYN packets.

Figure 9:
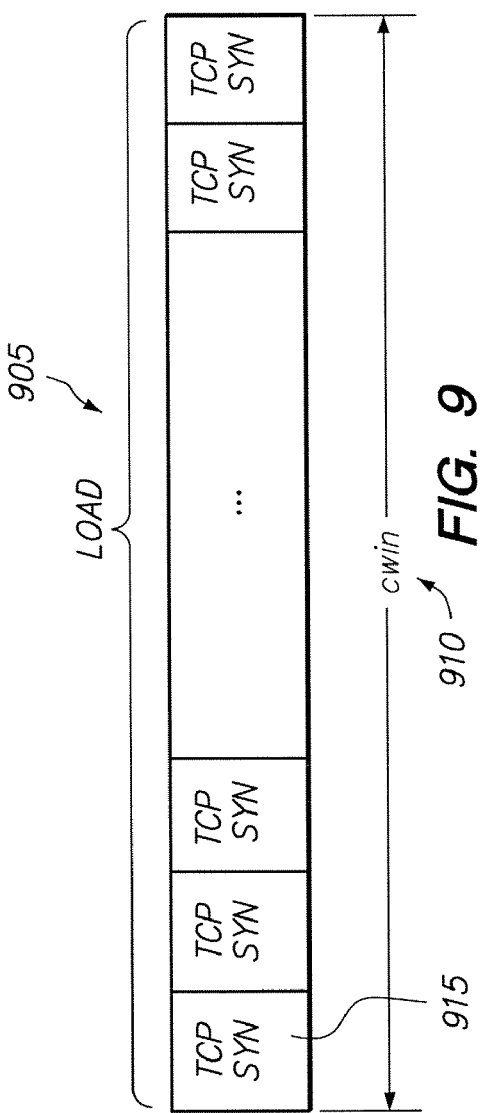
FIG. 9 shows an example of a variable length packet train for use in a single-ended measurement system for measuring estimated throughput, according to an embodiment of the disclosed subject matter.

FIG. 9 shows an alternative packet train configuration 905 than can be used to measure throughput, which is an important parameter for TCP-like protocols. It is defined as the number of bits transferred over a long period of time, per unit time. In other words, the bandwidth achieved in bits/second until any time $t_n$, starting from $t_0$. This packet train is formed by cwin 910 TCP SYN 915 packets, all of which are addressed to unused ports on the receiving host. Upon receipt of the each TCP RST from the receiving host, a measurement of throughput may be made. For example, at some packet where $P_n$, where n<cwin, the number of bits sent since base time $t_0$, when the first RST is received, can be determined and that value can be averaged over time $t_n-t_0$ to compute throughput: throughput=(n·MSS·8)/($t_n-t_0$), where n is the number of packets received and MSS is the maximum segment size. This technique has the advantage that, in the face of congestion, when the current packet train is discarded, there will still be a set of measurements that were made prior to the point at which the congestion was encountered, even if replies are not received for the entire packet train. The measured throughput values provide a way of characterizing the quality of the network path using a measure that is relevant to TCP-based applications.

Figure 10:
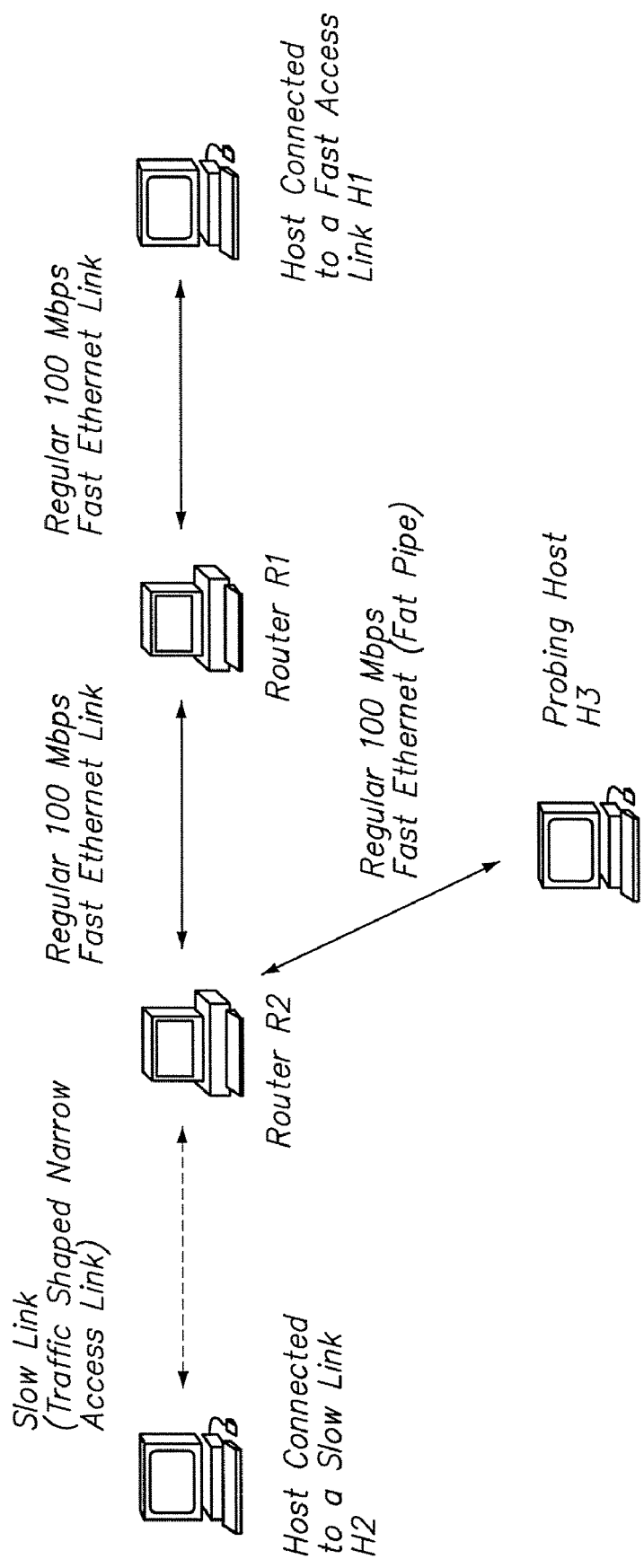
FIG. 10 shows an in-lab test configuration for measuring the installed and available capacity of a link connecting a host and a router.

The methods described above make it possible to estimate data transmission characteristics of a network path based on single-ended measurements. In other words, to determine characteristics such as the installed and available capacity to any host connected to a network from only one host in the network. One aspect of this capability is the ability to determine the installed and available capacity to a host, even from a host having low access link capacity, e.g., an individual user connected to the Internet through a DSL/Cable ISP Link. To emulate such a link, in-lab test configuration was set up as shown in FIG. 10. In FIG. 10, the dashed and double-headed arrow represents a traffic-shaped link, which was used to emulate the slow-access link. The probing host, H3, executes a method such as those described above to determine the available capacity, i.e., available bandwidth, to the host H2. Host H3 can be seen as an approximation of an end host with a slow access link. There is also a host, H1, which generates the cross traffic (i.e., CBR-UDP and elastic HTTP cross traffic to H2).

The topology shown in FIG. 10 was used for the in-lab experiments, with the goal of making measurements to estimate the installed and available capacity of the traffic-shaped, slow-access link, shown using the dashed and double-headed arrow (connecting H2 to router R2), from the probe host H3, in the absence and presence of cross traffic generated by host H1 connected to the network using a fast 100 Mbps Fast Ethernet Link. The probing host H3 used in this test had the following features:

CPU: Intel Celeron 2.0 GHz

Operating System Linux 2.4/Linux 2.6.17 (patched with Linux high resolution timer)

Software Packages RedHat 9.0/Fedora Core 5

Network Interface Card: Integrated 10/100 Ethernet Adaptors

Network Link Emulation: Nistnet (for emulating the slow access link, nistnet was used to traffic-shape a 100 Mbps ethernet link to the required link capacity)

Host H1 generated cross traffic to the host H2, which is connected to the rest of the network through a traffic-shaped slow link (shown through the dashed and double-headed arrow connecting H2 to the router R2). Router R2 emulated a slow access link using Nistnet network link emulation program. The probe host H3 executed the methods described above and various other installed/available capacity estimation tools for comparison purposes. The operating system used on all the machines was Linux 2.6.15. The probe host ran both Linux 2.4 and Linux 2.6.17 patched with the Linux High Resolution Timer. The measurement of installed and available capacity involved generation of non-elastic Constant Bit-Rate (CBR) UDP traffic and elastic HTTP traffic. The CBR-UDP traffic was generated using Real-time UDP Data Emitter (RUDE) and Collector of RUDE (CRUDE).

HTTPERF was used to generate TCP workloads. To measure the installed and available capacity from R2 to H2 (over the slow access link) in the presence of cross-traffic, the methods described above were executed and compared to conventional tools, such as IPERF, pathchar, pathload, etc., between the probing host H3 and H2.

Figure 11:
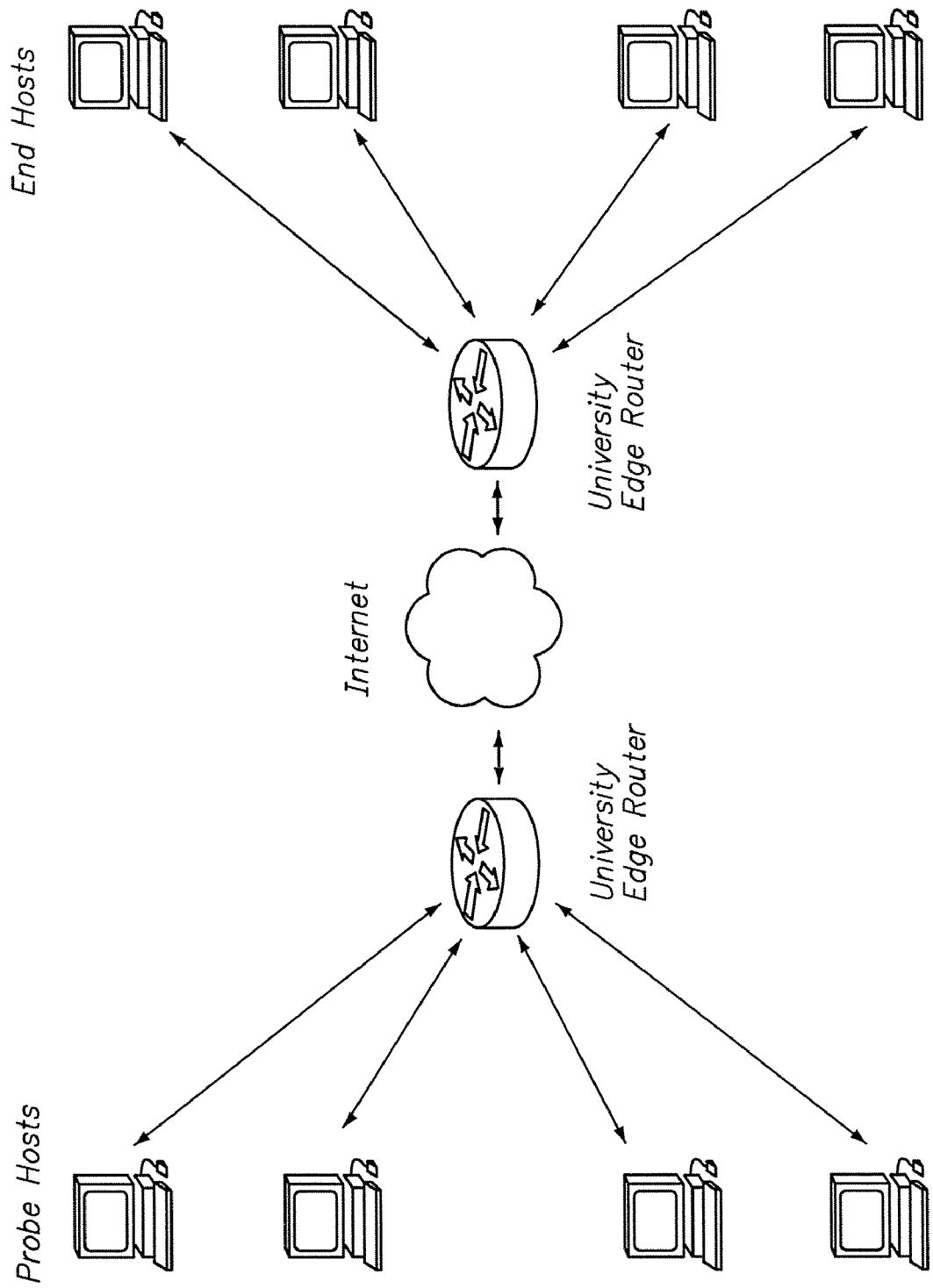
FIG. 11 shows a topology used for measuring the available capacity of hosts connected across the Internet.

The topology shown in FIG. 11 was used for measuring the available capacity of hosts connected across the Internet. This involved measuring the installed and available capacity of the end-to-end path connecting hosts across the Internet using the methods described above (referred to in the tables as "Link-Width") to compare the results to other tools, such as IPERF and PATHCHAR. Thus, experiments were performed to measure installed and available capacity both in an in-lab setup (where parameters such as bottleneck link capacity and cross traffic rate could be controlled) and across hosts connected to the Internet (where such parameters could not be controlled).

FIG. 12 shows the results obtained from the measurement of installed and available capacity of the slow link using the various tools and by varying the CBR/UDP cross-traffic flowing over the slow access link connecting R2 to host H2. The results appear to indicate that what is being measured is the un-utilized capacity of the link, rather than the installed capacity. Unlike reactive TCP traffic, CBR/UDP is aggressive and does not slow down in the presence of cross-traffic. The full capacity of the link cannot be achieved in the presence of aggressive CBR/UDP cross traffic. Thus, the measurements provide an estimate of available bandwidth. The measurement units in the various tables described below are in Mbps. "I" indicates installed capacity, and "A" indicates available capacity. In the abget measurements, which are asymetrical, "U" indicates uplink and "D", indicates downlink. The "Link-Width" results are expressed as "first result/second result". The first result for "LinkWidth" was obtained using Linux 2.4, while the second result was obtained using Linux 2.6.17 with the high precision timer patched, as discussed above. As can be seen in the results, with Linux 2.6.17 it was not possible to generate inter-packet delays less than 1 microsecond. This placed an upper bound on the highest sending rate of about 78 Mbs.

The same experiment was repeated with the link bandwidth of the slow access link connecting H2 to R2 decreased to 10 Mbps. FIG. 13 presents the results from the experiment. In both cases, part of the link capacity being used by CBR/UDP cross traffic is inaccessible, because the CBR/UDP cross-traffic is as aggressive and opportunistic as the probe traffic.

Experiments were run with generated elastic TCP cross-traffic. Two different kinds of workloads were generated, one using wget (which results in single, long lived TCP connections for large files) and HTTPERF (which gives multiple, simultaneous short lived TCP connections). In each case, the web server was run on host H2, while the client programs (wget and httperf) were run on host H1. The probe host H3 was used for measuring the installed and available capacity of the traffic-shaped slow link connecting host H2 to router R2. FIG. 14 presents results obtained from measuring installed and available capacity in the presence of elastic long lived connections (achieved by running many single-threaded wgets from H1 to H2 over the traffic shaped bottleneck link connecting R2 to H2).

The TCP connection setup by wget seeks to achieve the maximum capacity. However, the presence of probing cross traffic from the tools mentioned above causes the packets to be queued (and may also cause them to be dropped), thereby causing TCP to reduce its sending rate. This lower sending rate makes room for the probe traffic, and therefore the available capacity achieved is that available to the probe traffic in the presence of elastic wget traffic. TCP traffic, which as noted above is generally non-aggressive and elastic, makes room for the aggressive probe traffic (particularly in the case of tools like methods described above which do not set up a true end-to-end TCP connection) or shares the bandwidth equally with the end-to-end TCP probe traffic of tools like IPERF, Pathchirp, etc.

The methods described above respond to the received dispersion $R_m$ being greater than the sending dispersion $R_o$ by reducing the offered rate (OFFR), but much less precipitously then ordinary TCP senders. This causes the probing host H3 to grab a larger share of the end-to-end installed capacity, resulting in a slight over-estimation of the available capacity. However in some instances, these methods underestimate the available capacity in the presence of asymmetric and lossy link.

The experimental results discussed above do not necessarily show the actual available/utilized capacity of the path in presence of both probe traffic and cross traffic. Rather, the results show how much the probe traffic is able to achieve, with no definitive evidence that what is achieved is actually a share of the bandwidth, i.e., where one of the share is for probe traffic, while the other share is due to the cross traffic.

Experiments were created in which the cross-traffic is due to multiple simultaneous TCP connections, where the capacity is equally shared amongst all multiple, simultaneous connections and in which the probability of the probe traffic to be successfully sent (without transmission errors and re-ordering) is equally likely as that of the TCP cross-traffic. This would be expected to give a more accurate measure of the available capacity. Moreover, these experiments seek to achieve a situation in which the probe trains are aggressive, while at the same time reactive enough to slow down the sending rate upon reaching a rate at which the ratio of the end-to-end dispersion of the receiver to the sending dispersion is equal to unity, within an error bound, $\epsilon$: $\epsilon > |R_m/R_o - 1|$. In such a situation, the end-to-end dispersion of the packet train (or train of packet pairs) should be same as at the sending end. HTTPERF was used to generate multiple simultaneous connections over the traffic-shaped slow link path from the H1 to H2 via R2. The link from H3 to H2 was probed using the methods described above, IPERF and abget. The results of the experiment are shown in FIG. 15.

As shown in FIG. 15, in most cases what was measured was only a share of the entire capacity. HTTPERF supports simultaneous connections, and the number of connections at any time is controlled by the connection rate (expressed as the number of connections per second) parameter. The number of calls per connection controls the number of HTTP requests per connection (session oriented HTTP workloads were emulated). The longer the number of calls per connections, the longer the lifetime of the connections, and the more aggressive they are. For N connections per second, sharing the link with capacity C, the achieved capacity of our probe should be approximately C/(N+1). The results presented in FIG. 15 are thus in accordance with the supposition presented above regarding increased accuracy in the presence of multiple connections. This has been verified by the measurements using IPERF, which is a two-ended measurement and, generally speaking, more accurate than one-ended measurements. In this experiment, the effectiveness of abget was also evaluated, but the results indicate that abget is not able to correctly determine the available capacity for very small link capacities which are congested with cross traffic. The installed and available capacity determined using the methods described above are close to what is achievable by an end-to-end TCP connection (which is how IPERF operates).

The next experiment sought to measure the installed and available capacity of hosts connected to the Internet using methods described above and verify them using IPERF (to verify available end-to-end available capacity) and pathchar (to verify the end-to-end bottleneck capacity). IPERF gives an accurate estimate of the available capacity available for a TCP link, because it sets up a client-server connection and tries to send at best effort capacity. Pathchar, although taking long to converge, closely estimates the installed/bottleneck capacity under various scenarios of link capacities and cross-traffic rate. FIG. 16 gives a comparison of LinkWidth, Pathchar and Iperf when measuring the installed and available capacity to three separate destinations. The first two are two hosts in two different universities connected to the Internet. The third is a privately owned computer connected to the Internet through a local ISP. All these hosts were probed from a host within a university's Local Area Network.

These experiments were repeated by probing various geographically dispersed hosts, connected to the PlanetLab network. The results are presented in FIG. 17. These results are quite close to those obtained from using IPERF (which creates an end-to-end TCP connection). Pathload, on the other hand, apparently overestimates the results in the presence of uncontrolled cross-traffic.

In some embodiments, computer readable media encoded with computer executable instructions that, when executed by a processor, cause the processor to perform the methods described herein can be provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for computing data transmission characteristics of a network path, the method comprising:
    transmitting a packet train comprising at least one first TCP packet of a first type at a head end of the packet train, at least one second TCP packet of the first type at a tail end of the packet train, and a plurality of TCP packets of a second type placed between the head end and the tail end of the packet train, wherein each TCP packet in the packet train is addressed to an unused port on a different router along the network path and wherein the TCP packets of the first type result in a response from the router and the TCP packets of the second type do not result in a response from the router;
    receiving responses from each router along the network path in response to the head end of the packet train and in response to the tail end of the packet train; and
    using the responses to compute at least one data transmission characteristic of the network path.

2. The method of claim 1, wherein the router comprises one or more intermediate routers and wherein the IP address of each intermediate router is determined.

3. The method of claim 1, further comprising determining a topology of the network path.

4. The method of claim 1, further comprising determining an optimal network path based at least in part on the computed data transmission characteristic.

5. The method of claim 1, further comprising:
    determining a time delay between the responses received from each router;
    determining a dispersion value for each router based on the corresponding time delay of the router; and
    computing a capacity of the network path based on the length of the packet train and the maximum of the dispersion value for each router.

6. The method of claim 1, wherein each head end packet is addressed to one of a consecutive sequence of unused port numbers, in increments of two, and each tail end packet is addressed to one of a consecutive sequence of unused port numbers, in increments of two, offset by one from the port numbers of the head end packets.

7. The method of claim 1, further comprising determining a target offered rate between a minimum offered rate and a maximum offered rate, wherein the packet train is transmitted at the targeted offered rate.

8. The method of claim 1, further comprising:
    determining a time delay between the responses received from each router;
    determining a received dispersion value based on the time delay between the responses;
    determining whether a ratio of the received dispersion value to a sending dispersion value is equal to one, within a predetermined error range;
    setting the minimum offered rate equal to the target offered rate, if the ratio of the received dispersion value to the sending dispersion value is determined to be equal to one, within the predetermined error range;
    setting the maximum offered rate equal to the target offered rate, if the ratio of the received dispersion value to the sending dispersion value is determined not to be equal to one, within the predetermined error range;
    repeating the preceding steps until the difference between the minimum offered rate and the maximum offered rate is less than a predetermined threshold; and
    determining available bandwidth based on at least one of the minimum offered rate and the maximum offered rate.

9. The method of claim 8, wherein the available bandwidth is determined by calculating the mean of the minimum offered rate and the maximum offered rate.

10. The method of claim 8, further comprising:
    setting an initial value of the minimum offered rate to zero; and
    setting an initial value of the maximum offered rate to an estimated capacity of the network path.

11. The method of claim 1, further comprising determining whether a window size is less than a threshold, wherein the window size specifies a number of packets.

12. The method of claim 11, further comprising doubling the window size upon determining that the window size is less than the threshold.

13. The method of claim 11, further comprising increasing the window size by one upon determining that the window size is less than the threshold.

14. The method of claim 11, further comprising:
    setting the threshold equal to a preceding window size upon determining that the responses have not been received correctly by a sending host;
    determining an estimate of available bandwidth based on the window size; and
    repeating until the estimate of available bandwidth remains constant for a predetermined number of iterations.

15. The method of claim 14, further comprising:
setting an initial value of the window size to one; and
setting an initial value of the threshold to a maximum TCP window size.

16. The method of claim 14, further comprising:
setting an initial value of the threshold to a maximum TCP window size; and
setting an initial value of the window size based on an estimate of available bandwidth determined by transmitting the packet train, having a target offered rate, from the sending host.

17. A system for computing data transmission characteristics of a network path, the system comprising:
a processor that:
transmits a packet train comprising at least one first TCP packet of a first type at a head end of the packet train, at least one second TCP packet of the first type at a tail end of the packet train, and a plurality of TCP packets of a second type placed between the head end and the tail end of the packet train, wherein each TCP packet in the packet train is addressed to an unused port on a different router along the network path and wherein the TCP packets of the first type result in a response from the router and the TCP packets of the second type do not result in a response from the router;
receives responses from each router along the network path in response to the head end of the packet train and in response to the tail end of the packet train; and
uses the responses to compute at least one data transmission characteristic of the network path.

18. A non-transitory computer-readable medium encoded with computer-executable instructions that, when executed by a processor, cause the processor to perform a method for computing data transmission characteristics of a network path, the method comprising:
transmitting a packet train comprising at least one first TCP packet of a first type at a head end of the packet train, at least one second TCP packet of the first type at a tail end of the packet train, and a plurality of TCP packets of a second type placed between the head end and the tail end of the packet train, wherein each TCP packet in the packet train is addressed to an unused port on a different router along the network path and wherein the TCP packets of the first type result in a response from the router and the TCP packets of the second type do not result in a response from the router;
receiving responses from each router along the network path in response to the head end of the packet train and in response to the tail end of the packet train; and
using the responses to compute at least one data transmission characteristic of the network path.

\* \* \* \* \*